US007408449B2

(12) United States Patent
Denise

(10) Patent No.: US 7,408,449 B2
(45) Date of Patent: Aug. 5, 2008

(54) PROCESS FOR THE CONTROL AND ACTUATION OF VEHICLE DASHBOARD INDICATORS

(75) Inventor: Sylvain Denise, Vaureal (FR)

(73) Assignee: Johnson Controls Automotive Electronics, Cergy Pontoise Cedex (FR)

( * ) Notice: Subject to any disclaimer, the term of this patent is extended or adjusted under 35 U.S.C. 154(b) by 572 days.

(21) Appl. No.: 10/475,909

(22) PCT Filed: Apr. 27, 2001

(86) PCT No.: PCT/FR01/01308

§ 371 (c)(1),
(2), (4) Date: Apr. 27, 2004

(87) PCT Pub. No.: WO02/089067

PCT Pub. Date: Nov. 7, 2002

(65) Prior Publication Data

US 2004/0178922 A1 Sep. 16, 2004

(51) Int. Cl.
*B60Q 1/00* (2006.01)

(52) U.S. Cl. ...................................... 340/438; 340/461

(58) Field of Classification Search ................ 340/438, 340/461, 462

See application file for complete search history.

(56) References Cited

U.S. PATENT DOCUMENTS

| | | | | |
|---|---|---|---|---|
| 3,740,570 | A * | 6/1973 | Kaelin et al. | 307/40 |
| 4,122,395 | A * | 10/1978 | Schotz et al. | 455/158.5 |
| 4,184,146 | A | 1/1980 | Fratzke et al. | |
| 4,234,866 | A | 11/1980 | Kuroda et al. | |
| 4,414,539 | A | 11/1983 | Armer | |
| 4,975,691 | A * | 12/1990 | Lee | 345/79 |
| 5,134,387 | A * | 7/1992 | Smith et al. | 345/83 |
| 5,751,263 | A * | 5/1998 | Huang et al. | 345/82 |
| 6,498,438 | B1 * | 12/2002 | Edwards | 315/169.3 |

FOREIGN PATENT DOCUMENTS

| | | |
|---|---|---|
| DE | 3046079 A1 | 7/1982 |

OTHER PUBLICATIONS

PCT International Search Report for PCT/FR01/01308, dated Jan. 14, 2002.

* cited by examiner

*Primary Examiner*—George Bugg
*Assistant Examiner*—Travis R. Hunnings
(74) *Attorney, Agent, or Firm*—Foley & Lardner LLP

(57) ABSTRACT

The process for the control and activation of vehicle dashboard indicators (121, 122, 221) consists in distributing the indicators into x groups (1, 2, 3, 4) of indicators (121, 122, 221) and in performing a time division multiplexing of the groups (1, 2, 3, 4), by determining an actual value of instantaneous excitation of the indicators (121, 122, 221) and by regulating a shape factor for multiplexed control and activation of the indicators (121, 122, 221) as a function of the deviation between the actual excitation value and a preset value.

5 Claims, 1 Drawing Sheet

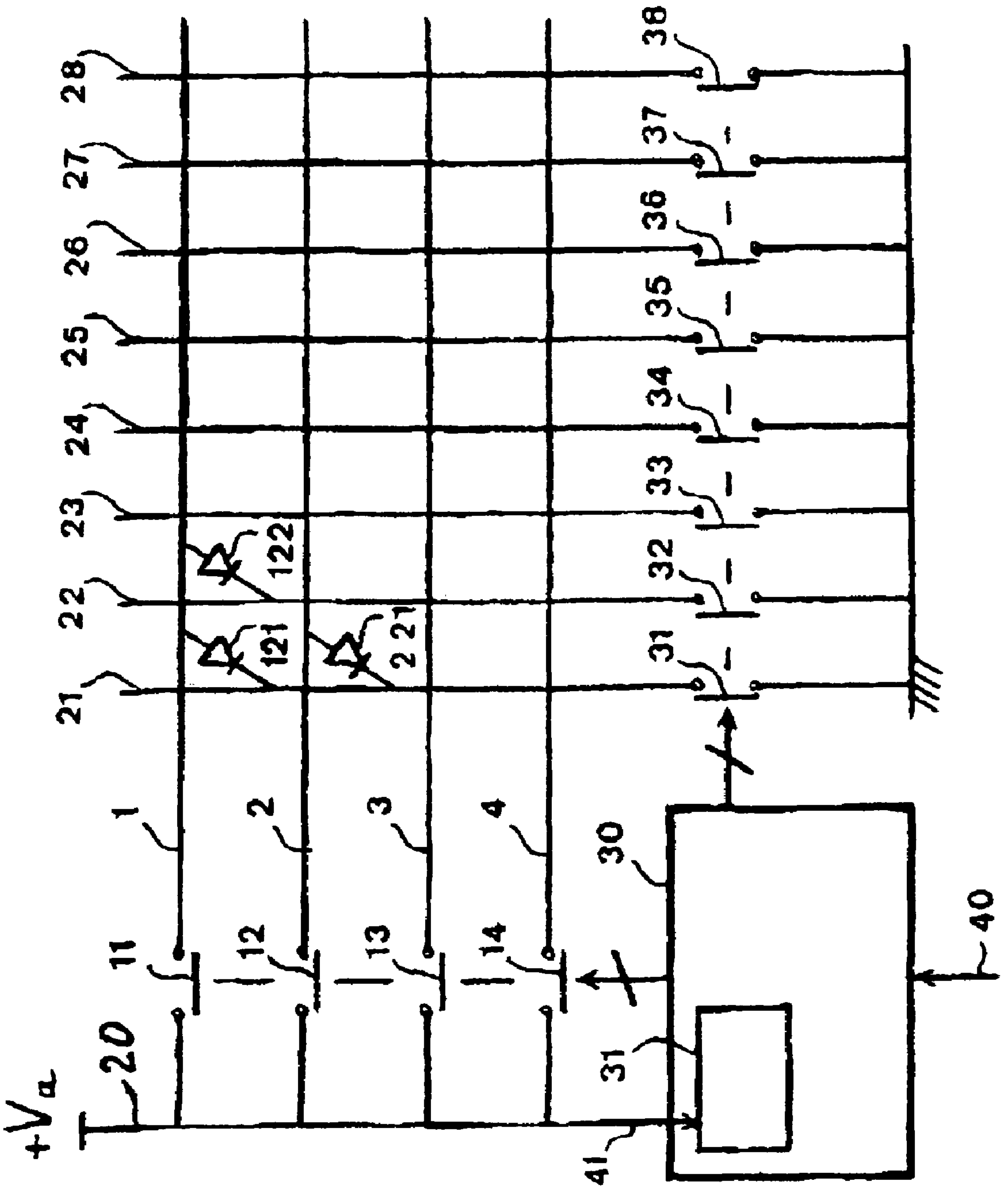
+Va
20
11
12
13
14
1
2
3
4
21
22
23
24
25
26
27
28
121
122
221
31
32
33
34
35
36
37
38
30
31
40
41

PROCESS FOR THE CONTROL AND ACTUATION OF VEHICLE DASHBOARD INDICATORS

BACKGROUND

The present invention relates to the control and the activation of vehicle, in particular automobile, dashboard indicators.

An automobile vehicle dashboard comprises in particular warning lights or signaling indicators, that show the driver the state of various sensors signaling that a door is not properly closed, that a handbrake is not off that a belt is not fastened, for example.

The conventional solution for controlling and activating the indicators consists in linking them in point-to-point mode to the associated sensor. Hence, one needs as many links as indicators, each comprising a transmitter linked to a receiver of the dashboard that controls a power make/break switch for the associated indicator.

The volume of components is therefore dependent on the number of indicators and is therefore not insignificant once this number reaches a few tens.

SUMMARY

The present solution aims to reduce the volume, and hence the cost, of the corresponding hardware.

For this purpose, one embodiment relates to a process for the control and activation of vehicle dashboard indicators, characterized in that the indicators are distributed into groups of indicators and a time division multiplexing of the groups is performed.

Advantageously, the indicators are activated via packets of indicators extracted from several groups of indicators, the indicators of each packet belonging to several groups.

The invention will be better understood with the aid of the following description of a preferred mode of implementation of the process of the invention, and with reference to the single figure and the claims.

BRIEF DESCRIPTION OF THE DRAWING

FIG. 1 represents circuits for control and activation of a set of 32 automobile vehicle dashboard indicators.

DESCRIPTION OF THE PREFERRED EMBODIMENTS

Reference 30 of the figure, indicates a microprocessor for control and activation of 32 indicator lights of an automobile vehicle dashboard. As illustrated by the few indicators 121, 122, 221 represented, here light-emitting diodes, LEDs, the indicators are linked, anode side, to a positive supply line (row) or bus 1 to 4 and, cathode side, to an individual control column 21 to 28, to form a rectangular matrix.

Rows 1 to 4 are linked to a low-voltage positive supply +Va onboard network 20 by respective make/break switches 11 to 14 controlled in time division, multiplexing mode by the microprocessor 30. The columns 21 to 28 are linked to ground by respective make/break switches 31 to 38 controlled by the microprocessor 30.

The microprocessor 30 receives, via a multiplexed control link 40, binary signals representing the states of 32 sensors to be displayed by the 32 respective indicators, hence here 4 bytes for the LEDs of the 4 respective rows 11 to 14. The voltage of the network 20 is applied to a converter CAN 31 of the microprocessor 30 through a link 41.

For this display, the indicators such as 121 having been distributed here into x=4 groups or rows, a time division multiplexing of the groups is performed. To do this, the microprocessor 30, in a first phase, closes the row make/break switch 11, the others 12 to 14 remaining open, and reads the byte received relating to row 1, so as to control the make/break switches 31 to 38 accordingly via the respective bits of the relevant byte. The LED indicators 121, 122 et seq. of row 1 whose grounding make/break switch 31 to 38 is closed are thus traversed by a current. A series resistor, not depicted, or any equivalent element, for regulating the current, has been provided for each LED. As a variant, it is integrated into them. The LED indicators (221) of the other rows 2 to 4 are simply controlled by grounding via those of the make/break switches 31 to 38 that are closed but are not activated since their anode is not powered.

In second, third and fourth successive phases, of the same durations as that of the first, the microprocessor 30 likewise controls the LED indicators (221) of the following groups or rows 2 to 4, as a function of the particular bytes to be displayed.

The number of LED indicators such as 121 may be less, in one or more rows, than the maximum capacity of columns, that is to say that groups of at most y (=8) LED indicators each are time-division multiplexed and that up to x times y (here 32) indicators are thus activated via x+y (here 12) make/break switches 11 to 14 and 31 to 38, with the associated control and activation signals originating from the microprocessor 30. The optimal gain in hardware (11-14, 31-38) corresponds to a rectangular matrix whose area is a maximum with respect to the sum of two adjacent sides, hence a square matrix (x=y).

The indicators of the various columns 21 to 28, such as those referenced 121, 221, constitute as many packets of indicators, each packet comprising indicators extracted from several groups or rows of indicators, all of which groups are different, and the indicators are activated sequentially within each packet.

Provision may be made to perform a time division multiplexing within each group or row 1 to 4, that is to say to sequentially close the make/break switches 31 to 38, so that at most a limited number of them is closed at a given instant, instead of closing them independently of one another as in the previous case. Hence, one displays, by intragroup multiplexing, the 32 bits received not now per complete row, here of one byte, but per blocks of smaller size than a row, for example per 4 bits or 2 bits or else bit by bit.

In all cases, one chooses a sufficient frequency of operation, or repetition of cycles, such that the flashing is imperceptible to the eye, for example at least 20 Hz or even 50 Hz. In the case oft a variant with heated-filament indicators, they would furthermore exhibit thermal inertia, and hence luminous emission, that would partially filter the pulsed component of their control regardless of the multiplexing scheme, intergroup or else intragroup. The temporal shape factor of the individual excitations of the indicators, regardless of their technology, must however be sufficient for the indicators to each receive sufficient excitation and thus retain an at least minimal luminous efficiency. Provision may be made for this purpose to overexcite the indicators 121 with a current exceeding the nominal DC current value, so as to partially compensate for idle times.

In order to stabilize the excitation of the indicators 211, and hence the luminous flux that they emit, their excitation or activation, in the phase relevant to them, here exhibits a shape factor that varies oppositely to the value of the voltage Va of the onboard network 20, applied as input to the micro-processor 30 and measured in the latter by the analogue/digital converter CAN 31. An actual value of instantaneous excitation of the indicators such as 121 is determined and the shape factor for multiplexed control and activation of the indicators such as 121 is regulated as a function of the deviation between the actual, effective excitation value and a preset value. Two solutions are possible for this purpose.

According to the first solution, the duration of activation or excitation of the indicators such as 121 is made to vary, oppositely to the voltage of the network 20, in the phase, of fixed duration, relevant to each. For example, if the multiplexing frequency is, 50 Hz, the overall period of 20 ms is here divided into 4 phases of 5 ms per row 1 to 4. The nominal duration of closure of each row make/break switch 11 to 14 or of the make/break switches 1 to 8 is for example at maximum, 5 ms. The activated make/break switches 1 to 8 are for example closed for a fixed duration equal to 5 ms of their phase and each make/break power switch 11 to 14 (or a general make/break switch) has a nominal, or preset, duration of closure of 3 ms, which is modulated oppositely to the variation in the voltage of the network 20. The temporal shape factor of the excitation of each indicator such as 121 is therefore regulated so as to compensate for the effect of the voltage variations of the network 20.

According to the second solution, the duration of excitation of the indicators such as 121 is fixed (here 3 ms) and it is the overall period (here 20 ms) of operation of the plurality of phases that varies, in the same direction as the voltage of the network 20. If this voltage increases, for example, the frequency of the row commands (11-14) decreases and the shape factor (3/20) of the duration of excitation of the indicators 121, normalized by the cycle time, therefore decreases proportionately.

Preferably, as here, the law of variation of the shape factor hereinabove is chosen as a function of the response curve of the luminous efficiency of the indicators such as 121 with respect to the instantaneous current passing through them. Stated otherwise, an indicator such as 121 whose luminous efficiency would drop rapidly as soon as the excitation current falls slightly below the nominal current would be excited according to a rapidly increasing temporal shape factor, of inverse to the corresponding luminous efficiency drop.

In a variant embodiment, the series resistors for limiting the current in the LEDs such as 121 are replaced by a single, common resistor for at least each row 1 to 4, therefore with a resistor in series with each make/break switch, 11 to 14 or, preferably, a single series resistor linking them to the power supply 20.

Resistor is understood here to mean, any resistive element opposing the variations in the DC supply current, which element may therefore be an arrangement comprising a current limiting series transistor. The LEDs such as 121, 122 of one and the same row to 4 are then directly in parallel and the total current partially regulated by the common series resistor, is distributed among a variable number of 1 to 8 LEDs. The individual current that passes through each, therefore varies oppositely to the number of LEDs 121, 122 activated by the make/break switches 31 to 38. In suchlike case, the microprocessor 30 measures the instantaneous voltage downstream or across the terminals of the common series resistor and regulates the shape factor of the excitation of the LEDs of the activated row 1 to 4 according to one of the two solutions set forth hereinabove.

Furthermore, knowing the number of indicators such as 121, 122 that are activated in the relevant group through a common resistor, the microprocessor 30 regulates the excitation shape factor so that it varies in the same direction as this number. A supply current distributed among a limited number of indicators 121, 122 activated in a group is thus applied to them for a reduced relative duration, so as to compensate for the relatively high value of the individual current in each. This is repeated for each group, each of them therefore having its own shape factor.

In yet another variant, the individual limiting resistors within one and the same group are arranged in series with the make/break switches of columns 31 to 38. In suchlike case, the microprocessor 30 measures (or determines) via links that are not represented, the activation currents passing through each make/break switch 31 to 38 and associated LED and adjusts accordingly the duration of activation of each of them, by adjusting the durations of closure of the make/break switches 31 to 38, so that each activated LED such as 221 receives a substantially constant excitation which is therefore independent of the number of activated LEDs in the relevant group. Each LED such as 221 therefore has a particular shape factor.

The invention claimed is:

1. A process for the control and activation of vehicle dashboard indicators, wherein the indicators are distributed into x groups of indicators and a time division multiplexing of the groups is performed, in which a time division multiplexing of x groups of at most y indicators each is performed, thus activating said x y indicators via x+y activation signals, in which the indicators are activated via packets of indicators extracted from several groups of indicators, and in which an actual value of instantaneous excitation of the indicators is determined and a shape factor for multiplexed control and activation of indicators is regulated as a function of a deviation between an actual excitation value and a preset value.

2. A process for the control and activation of vehicle dashboard indicators, wherein the indicators are distributed into x groups of indicators and a time division multiplexing of the groups is performed, in which a time division multiplexing of x groups of at most y indicators each is performed, thus activating said x y indicators via x+y activation signals, in which the indicators are activated via packets of indicators extracted from several groups of indicators, in which an actual value of instantaneous excitation of the indicators is determined and a shape factor for multiplexed control and activation of indicators is regulated as a function of a deviation between an actual excitation value and a preset value, and in which, for the regulation, a duration of activation of the indicators is made to vary within a multiplexing period of fixed duration.

3. A process for the control and activation of vehicle dashboard indicators, wherein the indicators are distributed into x groups of indicators and a time division multiplexing of the groups is performed, in which a time division multiplexing of x groups of at most y indicators each is performed, thus activating said x y indicators via x+y activation signals, in which the indicators are activated via packets of indicators extracted from several groups of indicators, in which an actual value of instantaneous excitation of the indicators is determined and a shape factor for multiplexed control and activation of indicators is regulated as a function of a deviation between an actual excitation value and a preset value, and in which, for regulation, the indicators are activated for a fixed duration within a multiplexing period that is made to vary.

4. A process for the control and activation of vehicle dashboard indicators, wherein the indicators are distributed into x groups of indicators and a time division multiplexing of the groups is performed, in which a time division multiplexing of x groups of at most y indicators each is performed, thus activating said x y indicators via x+y activation signals, in which the indicators are activated via packets of indicators extracted from several groups of indicators, in which an actual value of instantaneous excitation of the indicators is determined and a shape factor for multiplexed control and activation of indicators is regulated as a function of a deviation between an actual excitation value and a preset value, in which, for regulation, the indicators are activated for a fixed duration within a multiplexing period that is made to vary, and in which, for the groups of indicators being powered through a common resistive element, the shape factor is regulated, for each group, as a function of the number of indicators activated in the relevant group.

5. A process for the control and activation of vehicle dashboard indicators, wherein the indicators are distributed into x groups of indicators and a time division multiplexing of the groups is performed, in which a time division multiplexing of x groups of at most y indicators each is performed, thus activating said x y indicators via x+y activation signals, in which the indicators are activated via packets of indicators extracted from several groups of indicators, in which an actual value of instantaneous excitation of the indicators is determined and a shape factor for multiplexed control and activation of indicators is regulated as a function of a deviation between an actual excitation value and a preset value, in which, for regulation, the indicators are activated for a fixed duration within a multiplexing period that is made to vary, in which, for the groups of indicators being powered through a common resistive element, the shape factor is regulated, for each group, as a function of the number of indicators activated in the relevant group, and in which, for the indicators being powered through individual resistive elements, the actual value of activation of each is determined so as to individually regulate a shape factor particular to each indicator.

* * * * *